May 29, 1934.  C. PEARSON  1,960,277
BUNCHING ATTACHMENT FOR TRACTOR MOWERS
Filed Jan. 30, 1933  4 Sheets-Sheet 2

Inventor
Charles Pearson
By H. P. Doolittle
Atty.

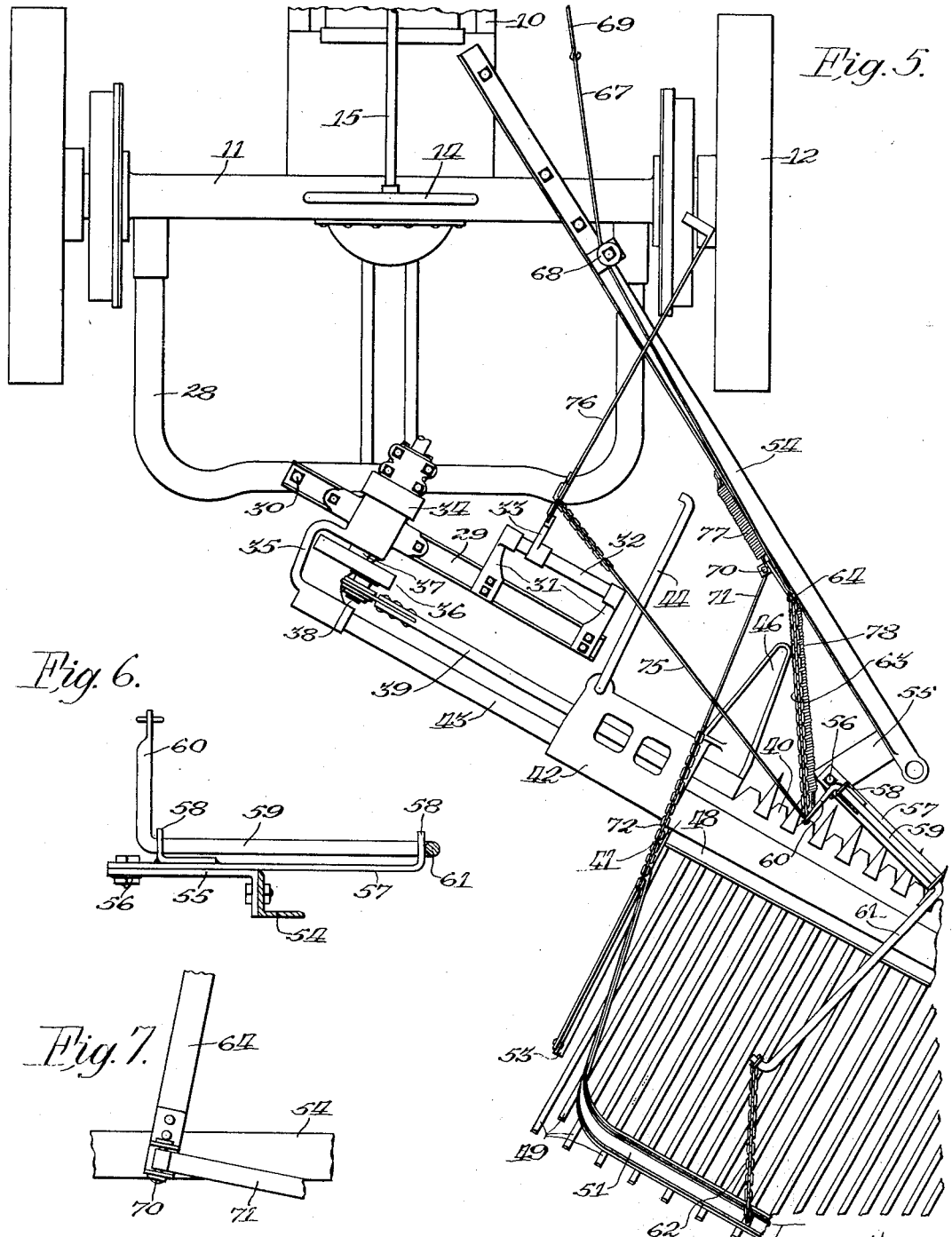

May 29, 1934.  C. PEARSON  1,960,277
BUNCHING ATTACHMENT FOR TRACTOR MOWERS
Filed Jan. 30, 1933  4 Sheets-Sheet 4

Inventor
Charles Pearson

Patented May 29, 1934

1,960,277

UNITED STATES PATENT OFFICE 1,960,277

BUNCHING ATTACHMENT FOR TRACTOR MOWERS

Charles Pearson, Waverly, Fla., assignor to International Harvester Company, a corporation of New Jersey Application January 30, 1933, Serial No. 654,208

14 Claims. (Cl. 56—25)

The invention relates to a bunching attachment for tractor mowers, which attachment is especially useful in connection with the harvesting of clover, although also useful in any haying operation where it is desired to harvest the crop and lay it in the field in bunches.

More particularly, the invention relates to a clover bunching attachment for a mower of the type disclosed in applicant's co-pending patent application Serial No. 323,848, filed December 5, 1928, now Patent No. 1,911,388, dated May 30, 1933, which mower is of the type carrier by the drawbar or suitable support at the rear end of the tractor, the mower attachment being pivotally connected to such support so that, when the cutter bar thereof encounters an obstruction, the mower may be released to swing back through a horizontal plane about such pivot to prevent damage to the cutter bar.

In providing a buncher attachment for such a cutter bar, a problem immediately arises every time the cutter bar swings back in the fashion described, because at such times the bunching attachment, which comprises fingers dragging over the ground, is subject to damage, and it is desirable, therefore, that means be provided for automatically raising the attachment a suitable distance above the ground at the instant the cutter bar begins its swinging back movement.

Another problem in this connection arises when the tractor is making a right hand turn in cutting around a corner, for it is a well known fact that at such times the mower cutter bar, instead of continuing in its forward movement during such turn, temporarily swings back opposite to the line of travel, and during such swinging back movement the attachment also is likely to become damaged, and it, therefore, becomes a problem to provide means for automatically raising the buncher fingers or slats automatically at this time.

Another problem in this connection is in the design of a control means accessible to the operator on his tractor for dumping the bunching attachment at intervals without interfering with the automatic lifting means operable when the cutter bar hinges back after meeting an obstruction or when it merely swings back upon right hand turns of the tractor.

With these problems in mind, it is the principal object of this invention to provide a clover or similar bunching attachment for the cutter bar of a tractor mower.

Another object is to provide such an attachment which will automatically raise off the ground to prevent damage thereto when the tractor makes right hand turns.

Another object is to provide an automatic lifting means for the buncher to prevent damage thereto when the cutter bar is released to swing rearwardly through a horizontal plane about its pivotal connection to the tractor drawbar or support when the cutter bar has encountered an obstruction.

Another object is to provide an improved dumping means for the buncher controllable by the operator from his station on the tractor.

Other objects will become apparent to those skilled in this art as the disclosure is more fully made.

Briefly, these desirable objects are accomplished in a tractor mower outfit of the kind in which the mower is drawn behind the tractor and is connected to the rear thereof and also driven from the power take-off shaft thereof, such mower embodying a releasable cutter bar that may swing back to save it from obstructions encountered. The clover bunching attachment is made up of a slatted bottom which normally drags over the ground behind the mower cutter bar, the slats being pivotally connected to the cutter bar. The mower cutter bar also pivotally carries a basket which rests on the slats, so that the clover or hay cut by the cutter bar will be accumulated on the slats and held there by the basket until the basket is raised at its rear end to permit the accumulated load of clover or hay to drag off the slats and so be deposited on the field in a bunch. A suitable beam or support is carried by the rear end of the tractor to carry controls for tilting the basket and slats at the required times, there being a control lever on the mower accessible to the operator on the tractor for raising the basket to dump the load; and, there further being automatically acting means controlled from the steerable support for the tractor that acts when the tractor makes a right hand turn to raise the bunching attachment off the ground to save the same from injury as the cutter bar swings back on such right hand turns of the outfit. These adjusting mechanisms carried on the support mentioned also are operative when the cutter bar hinges back after encountering an obstruction to raise the attachment independently of the steering control to save the attachment from injury at such times.

In the accompanying sheets of drawings illustrating the improved tractor mower bunching attachment,—

Figure 5 is a plan view of the tractor, mower, and attachment as shown when the tractor mower bar has released and swung partly back after encountering an obstruction;

Figure 6 is a detail view of a portion of the adjusting mechanism for raising the basket;

Figure 7 is a detail view of a part of the lever mechanism used in adjusting the parts of the attachment;

Figure 9:
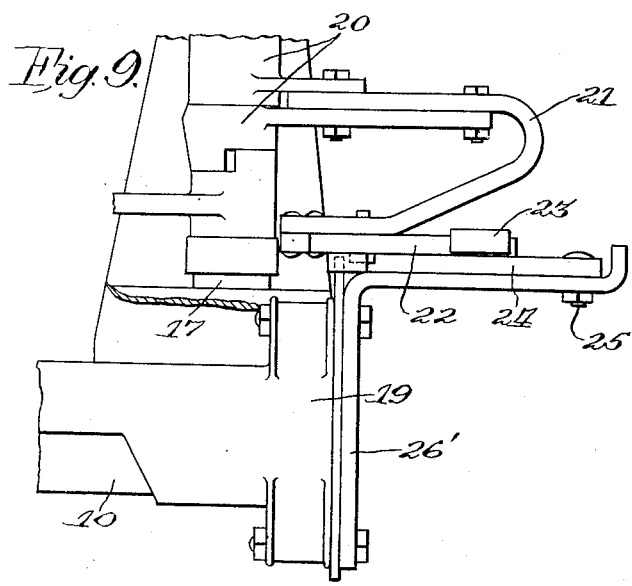

The tractor shown in these drawings is of the well known type, such as illustrated, for example, in the patent to Benjamin et al. No. 1,667,371 issued April 24, 1928, the tractor having a main frame 10 and a rear axle housing 11 from which extend depending castings 11' enclosing driving mechanism that drives the traction wheels 12. The tractor carries a seat 13 at its rear end accessible to a steering hand control wheel 14 which turns a shaft 15 extending longitudinally ahead to rotate a gear set 16 for turning a front vertical standard or spindle 17, the lower end of which is carried on a steering wheel support 18. The front end of the tractor frame 10 is carried by a front bolster member 19. Surrounding this tractor steering spindle 17, as shown best in Figure 9, is a sleeve structure 20 which turns with the spindle as the same is angled, said brackets 20 carrying a forwardly and reversely curved bracket 21, (see Figure 9), to the lower end of which is secured a cam arm 22 designed to engage a roller 23 mounted on a crossbar 24 pivoted at its left hand end by a pin 25 to a bracket 26 carried by the front bolster 19 of the tractor. There is another bracket 26' on the other end of the bolster 19, upon which the right hand or grassward end of the cross-arm 24 slidingly rests. The grassward end of the arm or bar 24 carries a clevis 27 for a purpose later to be made known.

Figure 1:
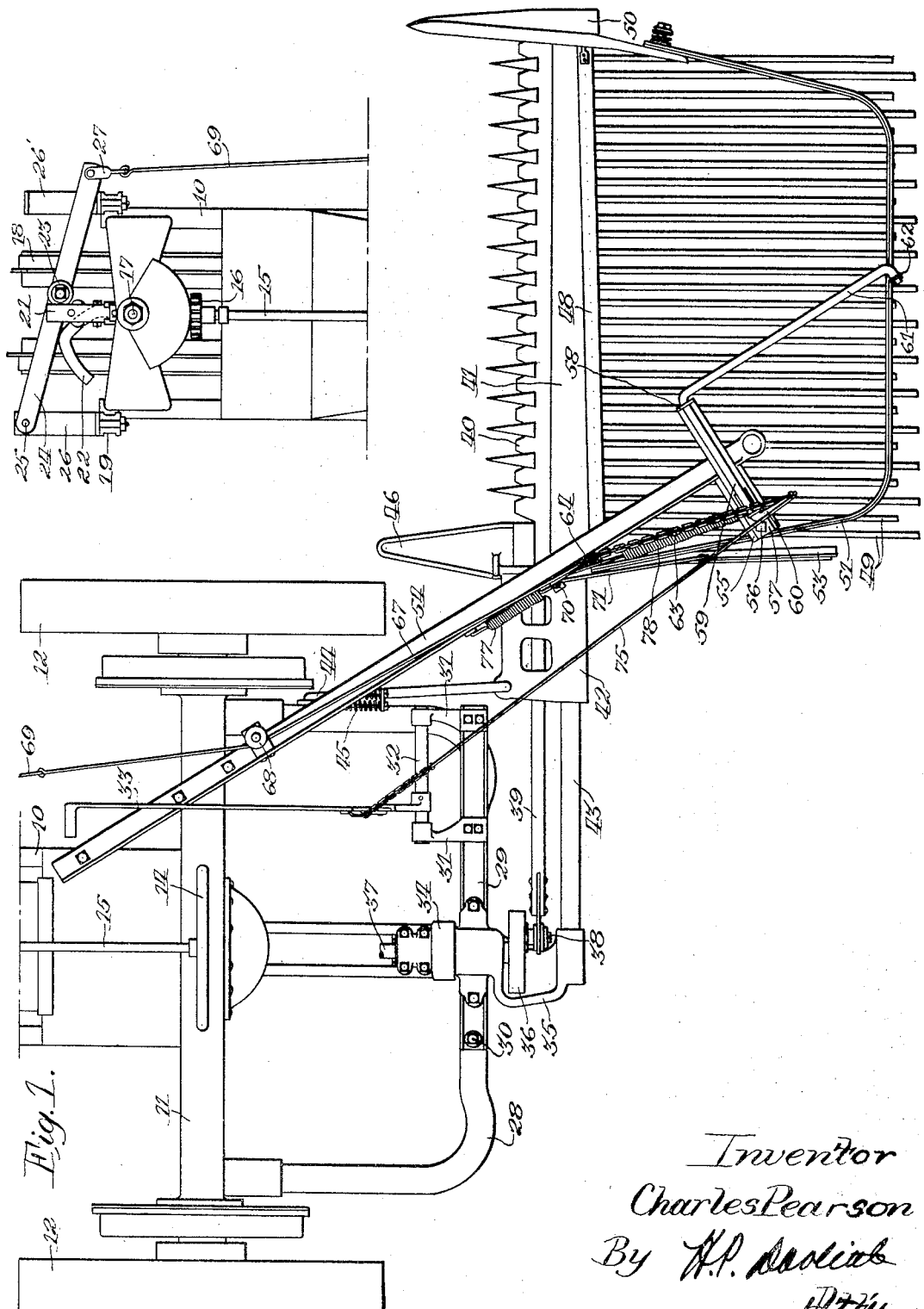
Figure 1 is a general plan view of the tractor and mower with the improved clover bunching attachment carried by the mower, the front part of the tractor being positioned to one side of the main view because of lack of space.

As shown in Figures 1 and 5, the rear end of the tractor carries a support 28, which may be the usual drawbar appropriately supported with relation to the tractor. This drawbar or support 28 is U-shaped, as shown, the bight thereof being disposed to the rear and carrying a plate 29 by means of a vertical hinge pin 30. The plate 29 also carries brackets 31 for supporting a member 32, on which is rockably disposed a lever 33 for a purpose later to appear.

The plate 29 carries a shaft housing 34 terminating in a bowl-shaped casting 35 which houses the mower flywheel 36, which is driven from the shaft 37, journaled in the housing 34 and having in any appropriate manner a disconnectible driving connection with the power take-off shaft of the tractor, not shown. The flywheel 36 drives the eccentric pin 38, to which is connected the pitman 39 which, in turn, is conventionally connected to reciprocate the knife 40 on a mower cutter bar 41, hingedly connected for vertical movement to the mower yoke 42 in the usual manner, said mower yoke being rockable on the grassward end of a coupling arm 43 carried by the bowl-shaped casting 35. The normal position of the cutter bar 41 is rearwardly of the tractor and transversely thereof, as shown in Figure 1, and it is held in such position normally by a release rod 44 extending longitudinally ahead and releasably connected by an overload release device 45 carried on the support 28. The mower also includes an inside shoe 46 and an outside divider 47.

In this type of mower, when the cutter bar 41 encounters an obstruction with sufficient force, as predetermined by the spring release 45, the rod 44 is released from the coupling 45 and, as a result, the entire mower, including the bar 41, arm 43, pitman 39, casting 34, and plate 29, swings back horizontally about the vertical pivot 30 to save the mower from damage, the drive shaft 37, which is splined to the power take-off shaft of the tractor, merely pulling out from said power take-off shaft to disconnect the drive from the tractor to the knife or sickle.

Figure 4:
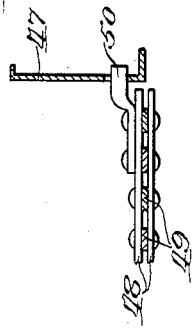
Figure 4 is a sectional view, as seen along the line 4—4 appearing in Figure 2, showing the manner of connecting the slatted bottom of the buncher hingedly to the outside divider on the mower cutter bar.
Figure 3:
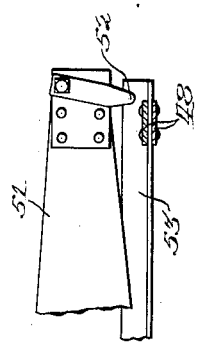
Figure 3 is a detail view showing the manner of connecting the buncher basket to the frame for the slatted bottom of the bunching attachment.

The improved clover bunching attachment for this mower comprises a transverse double plate arrangement 48 which serves to clamp, as shown in Figure 4, the rearward and longitudinally disposed, spaced fingers or slats 49; the crossbar 48 carrying a trunnion 50, which hingedly fits into the outside divider 47. In this fashion, the slotted buncher bottom 49 is associated with the cutter bar 41 to be positioned immediately therebehind, so that the clover or hay cut by the knife 40 falls back onto said bottom 49. So that the cut crop may be accumulated in bunches, a U-shaped basket member 51 is arranged on the slatted bottom with the legs of the U-shaped basket arranged adjacent the cutter bar 41 and the inner end thereof, as shown in Figure 3, carrying a hinge 52 for hingedly mounting the same in an angle iron bar 53 carried at the stubbleward end of the transverse plate structure 48. From this it will be seen that slatted bottom 49 and the basket or accumulator 51 are independently hinged with respect to the cutter bar 41, thus enabling the basket 51 to be raised independently of the slatted bottom 49 for discharging an accumulated load, or the slatted bottom and the basket 51 may be hinged upwardly together to be raised a suitable distance above the ground for a purpose later to appear.

Figure 2:
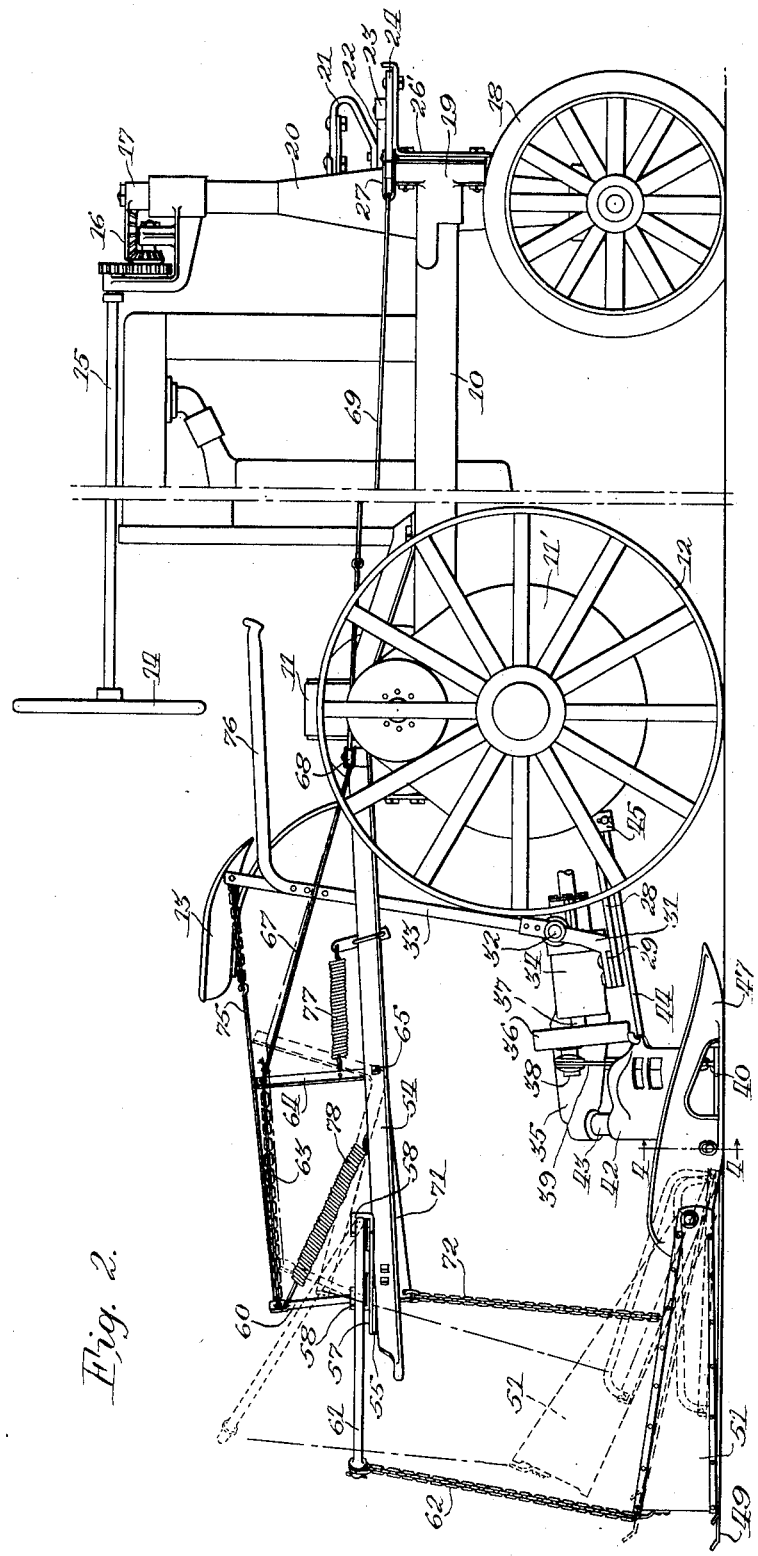
Figure 2 is a side elevational view of the tractor, mower, and attachment.
Figure 8:
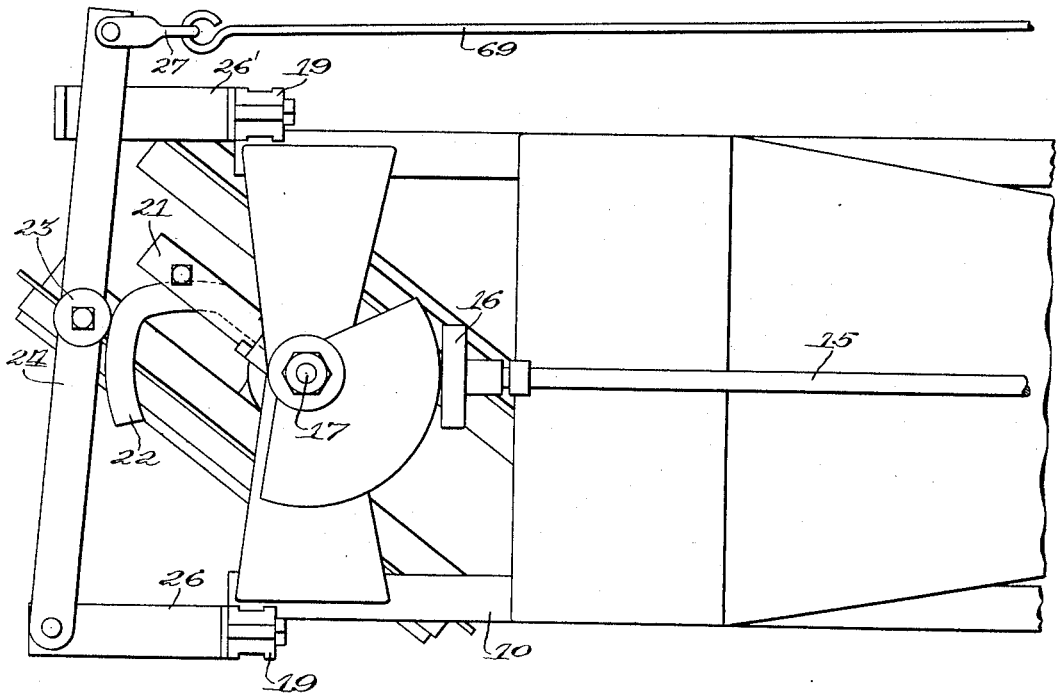
Figure 8 is a plan view of the front of the tractor on an enlarged scale to show the control parts operative when the tractor makes a right hand turn to automatically raise the bunching attachment; and, Figure 9 is a side elevational detail view to illustrate on an enlarged scale the front steering support mechanism of the tractor.

As shown best in Figures 1, 2 and 5, the tractor carries a diagonal support or beam 54, which extends rearwardly and outwardly in a grassward direction. The rear end of said beam 54 terminates at a point over the normal transverse cutting and gathering position of the bunching attachment, as shown in Figure 1. Mounted on the rear end of this beam 54 is a bracket 55 (see Figures 1 and 6), which bracket 55 is horizontally disposed and carries a vertical pivot hinge pin 56, which hingedly carries a bar 57 having its ends provided with ears 58 to journal a rockshaft 59 having an upturned crank end 60 and a rearwardly extending crank arm 61 at its other end. The crank 61 at its rear end carries a flexible element, such as the chain 62, which is connected to the bight or rear portion of the basket 51, while the upper end of crank arm 60 is connected by a chain or similar flexible element 63 to the upper end of a lever arm 64 pivoted at 65 to the beam 54. The lever arm 64 is in turn connected to a flexible cable 67 extending forwardly over the beam 54 and around a sheave 68 carried on the beam 54, said cable in turn being connected to a pull rod 69 connected to the clevis 27 heretofore described, as shown in Figure 8.

The lower end of the lever arm 64, as shown in Figure 7, carries a hinge pin 70, to which is pivoted for lateral swinging movement a lever arm 71 extending rearwardly and having its rear end connected to a chain 72, in turn, connected to the angle iron bar 53 heretofore described; in other words, to the slatted bottom 49.

The lever 33, fulcrumed on the shaft 32, has its upper end provided with a pull link 75 to operate the arm 60 heretofore described. Said lever 33 is actuated by a forwardly extending foot pedal arm 76 by the operator from his seat 13 on the tractor.

A spring 77 is provided to exert a tension on the lever 64 to assist in lifting the parts operable by the lever 64, and a similar tension spring 78 is provided for the arm 60 to assist it in performing its function, thereby lessening the force having to be exerted by the operator when he uses the lever 76.

In operating this tractor mower bunching outfit, the parts will be in the normal position shown in Figure 1 when starting out; that is, the release arm 44 will be coupled to the overload release 45, to hold the cutter bar 41 in its normal transverse cutting position. The slatted bottom 49 and basket 51 will be hingedly mounted as described in relation to the cutter bar 41, so that, as the mower cuts, the crop will be accumulated on the slatted bottom by the basket 51, the slatted bottom with the weight of the basket and the accumulated load dragging across the field behind the cutter bar. The rod 69 is coupled to the cross-arm 24 at the front end of the tractor, so that it will be effective to operate and perform its function, as will presently appear. When a predetermined load of cut clover or the like has accumulated on the slatted bottom 49 by means of the basket 51, the operator depresses the foot lever 76 to rock the lever 33, which in turn pulls on the link 75 to rock the arm 60 forwardly, in turn rocking the shaft 59 to raise the crank arm 61 and, as a result, through the chain 62, the basket 51 is tilted upwardly to cause the accumulated cut crop to be discharged from the slatted bottom 49 in a bunch on the field. In this operation, the spring 78 exerts a tension or force to assist lifting the basket because the spring is anchored to the beam 54 and pulls forwardly on the upper end of the crank arm 60, the chain 63 merely collapsing during such forward movement of the crank arm 60.

When the tractor is making a right hand turn, the cutter bar 41 moves differentially to the rear, as is well known in operating tractor mowers, and, as turning movement of the tractor is caused by angular movement of the vertical spindle 17 in angling the steering wheel 18, we find that the cam 22 turns angularly to the right with the spindle 17, as shown in Figure 8, the cam engaging the roller 23 to push the grassward end of the pivoted cross-arm 24 forwardly. This forward movement of the grassward end of the arm 24 transmits a forward pull on the rod 69 and flexible cable 67 to pull the lever 64 forwardly about its pivot 65, thus raising the lever 71 upwardly to pull the chain 72 with it and consequently raise the angle bar 53 upwardly. As the slatted bottom 49 is carried by the angle bar 53, the slatted bottom raises upwardly about its hinge 50 in the divider 47.

As the basket 51 is hingedly mounted above the slotted bottom, the basket at this time is, of course, raised. Thus, on right hand turns of the tractor, as the mower bar moves differentially rearwardly on the turn, the slatted bottom with the basket of the buncher attachment are automatically raised upwardly clear above the ground, so that the attachment cannot become damaged. The spring 77 is active at this time to help pull the lever 64 forwardly because the spring is tensioned and anchored on the beam 54, as shown in Figure 2.

When the cutter bar of the mower encounters an obstruction of sufficient force to disconnect the release rod 44, then the entire mower attachment swings rearwardly through a horizontal plane about its vertical hinge pin 30, as indicated in Figure 5, such rearward movement causing the fixed length of chain 63 to actuate the arm 60, crank shaft 59, and arm 61, to raise the basket 51, and at the same time the arm 71 is caused to swing laterally about its hinge 70 and create a lifting force on the chain 72 under such swinging movement, to raise the angle iron 53 and thus raise the slatted bottom 49 clear of the ground.

From this it will be seen that an improved clover bunching attachment has been provided for a rearwardly connected, release bar type of tractor mower, which achieves all of the objects of the invention heretofore recited.

It is the intention to cover herein all such changes and modifications which do not depart from the spirit and scope of the invention as indicated by the following claims.

What is claimed is:

1. In combination, a tractor, a mower drawn thereby, a bunching attachment pivotally carried by the mower, and means comprising connections between the tractor and attachment for raising the bunching attachment when the tractor makes a turn.

2. In combination, a tractor, a mower drawn thereby, a bunching attachment pivotally carried by the mower, and means comprising connections between the tractor and attachment controlled by a right hand turn of the tractor to raise the bunching attachment.

3. In combination, a tractor, a mower drawn thereby, a bunching attachment pivotally carried by the mower, and means comprising connections from the tractor to the attachment for automatically raising the bunching attachment when the tractor makes a right hand turn.

4. In combination, a tractor, a mower drawn thereby having a releasable connection to enable the mower to hinge back horizontally from a normal transverse cutting position with respect to the tractor when an obstruction is encountered by the mower, a bunching attachment pivotally connected to the mower, and means for automatically raising the bunching attachment when the mower is thus released and swings back.

5. In combination, a tractor, a mower drawn thereby having a releasable connection to enable the mower to hinge back horizontally from a normal transverse cutting position with respect to the tractor when an obstruction is encountered by the mower, a bunching attachment pivotally connected to the mower, and means operative when the mower is thus released and swings back to raise the bunching attachment.

6. In combination, a tractor, a mower connected to the rear of the tractor to be drawn thereby, a rearwardly extending support carried by the tractor, a bunching attachment hingedly mounted on the mower, said attachment comprising a separately hinged slatted bottom and a basket, means carried on the support for raising the basket to discharge the attachment, and operator controlled means for actuating said means.

7. In combination, a tractor, a mower connected to the rear of the tractor to be drawn thereby, a rearwardly extending support carried by the tractor, a bunching attachment hingedly mounted on the mower, said attachment comprising a separately hinged slatted bottom and a basket, and means carried on the support and controlled by turning movement of the tractor to raise the entire attachment.

8. In combination, a tractor, a mower connected to the rear of the tractor to be drawn thereby, a rearwardly extending support carried by the tractor, a bunching attachment hingedly mounted on the mower, said attachment comprising a separately hinged slatted bottom and a basket, said mower being hingedly and releasably connected to the tractor to enable the mower to swing back horizontally when the same is released by an obstruction, and means on the support acting when the mower swings back to raise the attachment.

9. In combination, a tractor, a mower connected to the rear thereof to be drawn thereby, a bunching attachment on the mower including a hinged basket, a support carried by the tractor, said support extending rearwardly and diagonally to a point above the attachment, and means mounted on the support and operable from the tractor to hinge the basket to discharge the bunching attachment.

10. In combination, a tractor, a mower connected to the rear thereof to be drawn thereby, a bunching attachment on the mower including a hinged basket, a rearwardly extending support carried on the tractor, lift connections carried on the support to raise the basket to discharge the bunching attachment, and a lever accessible to an operator on the tractor to actuate said lift connections.

11. In combination, a tractor, a mower drawn thereby, a bunching attachment, means connecting the bunching attachment to the mower so that the attachment may be raised relative to the mower, and means controlled by a turning movement of the tractor to raise the attachment.

12. In combination, a tractor, a mower drawn thereby, a bunching attachment, means connecting the bunching attachment to the mower so that the attachment may be raised relative to the mower, and means operable when the tractor makes a right hand turn to raise the attachment.

13. In combination, a tractor, a release bar mower connected thereto, a bunching attachment, means connecting the bunching attachment to the mower bar so that the attachment may be raised relative to the bar, and means for raising the attachment when the bar is released and swings back.

14. In combination, a tractor, a release bar mower connected thereto, a bunching attachment, means connecting the bunching attachment to the mower bar so that the attachment may be raised relative to the bar, and automatically acting means for raising the attachment when the bar is released and swings back.

CHARLES PEARSON.